United States Patent [19]

Engelke

[11] 4,295,632

[45] Oct. 20, 1981

[54] METHOD AND APPARATUS FOR REDUCING TORQUE ON AN AIR DAMPER

[75] Inventor: Roger P. Engelke, Roscoe, Ill.

[73] Assignee: Barber-Colman Company, Rockford, Ill.

[21] Appl. No.: 946,478

[22] Filed: Sep. 28, 1978

[51] Int. Cl.³ .................. F16K 1/22; F16K 47/08
[52] U.S. Cl. ................................ 251/127; 251/305
[58] Field of Search ............. 251/127, 305, 118, 283; 137/625.31

[56] References Cited

U.S. PATENT DOCUMENTS 4,100,938  7/1978  Dravnieks et al. ............. 137/625.31

FOREIGN PATENT DOCUMENTS

| 504037 | 3/1976 | U.S.S.R. | 251/305 |
| 571648 | 10/1977 | U.S.S.R. | 251/305 |
| 602731 | 3/1978 | U.S.S.R. | 251/305 |
| 611063 | 5/1978 | U.S.S.R. | 251/127 |

Primary Examiner—Arnold Rosenthal
Attorney, Agent, or Firm—Robert M. Hammes, Jr.

[57] ABSTRACT

A volume air flow controller having a butterfly damper mounted within an air duct and movable between open and closed positions employs a baffle, located upstream from the damper, as an air flow impedance to change the flow conditions upstream from the damper so as to reduce the normal damper closing torque resulting from aerodynamic forces produced by air flow past the damper.

8 Claims, 8 Drawing Figures

METHOD AND APPARATUS FOR REDUCING TORQUE ON AN AIR DAMPER

BACKGROUND OF THE INVENTION

This invention relates to control of the volume of air flowing through a duct. In particular, the invention concerns a method and apparatus for reducing the damper-closing torque in an air flow controller which results from aerodynamic forces acting on the damper so as to permit accurate damper position control using a relatively small actuator.

It is well known to control air flow through a duct using a betterfly damper mounted within the duct and pivoted near its midpoint. Typically, an actuator is employed to position the damper between open and closed positions in response to a sensed condition. An air flow control of this type is disclosed in U.S. Pat. No. 3,809,314 issued to Roger P. Engelke and Marvin H. Zille.

As is well known, a damper inclined to the air flow in a duct is subjected to aerodynamic forces similar to the lift and drag forces which act on an airfoil. These aerodynamic forces produce a torque which tends to close the damper. Because of the presence of this torque, the damper position control or actuator must act in opposition to the torque and must be able to withstand the effects of this torque in order to maintain the damper in the desired position. This situation necessarily limits the amount of reduction in actuator size and power consumption which can be achieved while maintaining accurate damper positioning capabilities.

SUMMARY OF THE INVENTION

In considering the limiting factors inherent in position control of dampers in air ducts, it was recognized that a smaller actuator with a lower power requirement could be utilized if the damper-closing torque could be reduced. It was found that the torque effect can be reduced by changing the air flow conditions such that the velocity of the air acting upon at least a portion of the damper is reduced.

According to the invention an air flow impedance is located in an air duct upstream from a butterfly damper in order to change the air flow conditions acting on the damper by reducing the air velocity in the proximity of the leading section of the damper. The reduction in air velocity results in a corresponding reduction in the aerodynamic forces acting on the damper with a consequent reduction in the damper-closing torque. In one embodiment the impedance comprises a baffle located in a plane substantially perpendicular to the air flow in a position such that the desired velocity reduction is obtained in the vicinity of the damper. Another embodiment provides a baffle with a plurality of openings over its surface area in order to obtain a degree of velocity reduction over a relatively large area without unduly increasing the inlet pressure requirements of the system.

A more complete understanding of the invention can be obtained from the following detailed description taken in conjunction with the drawing figures.

DESCRIPTION OF THE PREFERRED EMBODIMENTS

Figure 1:
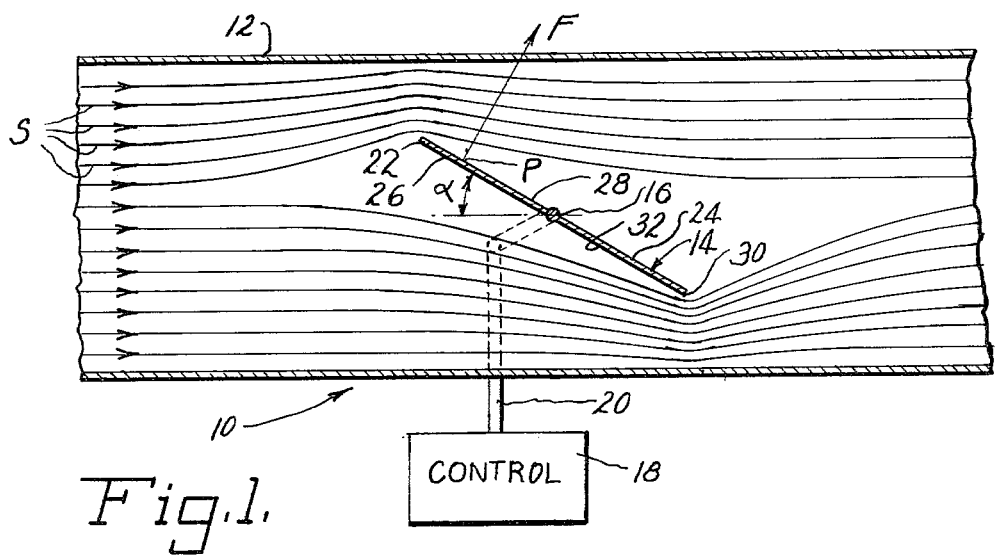
FIG. 1 is a section view of a typical volume air flow controller showing the torque-producing effect of air flow on a butterfly damper.

A typical volume air flow controller 10, shown in FIG. 1, comprises a duct 12 having a butterfly damper 14 supported at its midpoint by pivot 16. Damper 14 is positioned by control 18 which is operatively connected to damper 14 by linkage 20. Control 18 may be of any suitable type, such as a pneumatic actuator, and may be employed to position damper 14 in response to a sensed condition so as to obtain the proper amount of air flow through duct 12. Arrangements of this type are well known in the field of air flow control as exemplified by the aforementioned Engelke et al U.S. Pat. No. 3,809,314.

Figure 2:
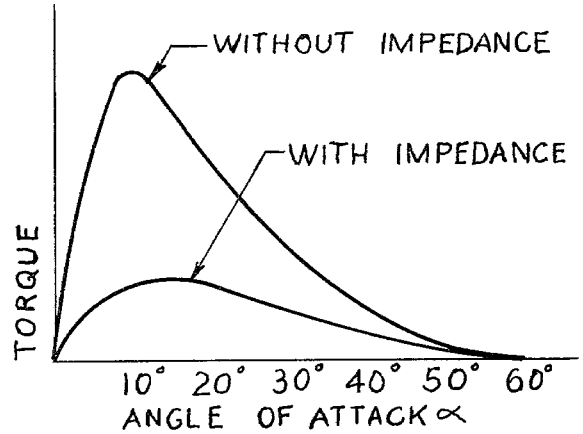
FIG. 2 is a graph of damper-closing torque plotted against the angle of attack for a typical air flow controller with and without air flow impedance.

Damper 14 is supported by pivot 16 for rotation about its central axis so that the damper is substantially balanced. Pivot 16 thus divides damper 14 into a leading section 22 and a trailing section 24. Air from a source (not shown) at the left in FIG. 1 is delivered through duct 12 and an approximation of the air flow pattern past damper 14 is illustrated by a plurality of streamlines S. When damper 14 is inclined in the stream at an angle of attack $\alpha$, the air flow past damper 14 creates an aerodynamic effect similar to the lift and drag forces which act on an airfoil in an airstream. A pressure differential develops across damper 14 such that the pressure acting on upstream surface 26 of leading section 22 is greater than the pressure on downstream surface 28 of leading section 22. In addition, the flow towards trailing edge 30 reduces the pressure acting upon upstream surface 32 of trailing section 24. The result of this air flow past damper 14 is to create an effective force F acting at a position P which results in a torque tending to close damper 14. The magnitude of force F and its position P will vary with changes in the angle of attack $\alpha$ and the velocity of the air flow. FIG. 2 shows how the damper-closing torque varies with the angle of attack for a typical butterfly damper which is fully closed when the angle $\alpha$ is 60 degrees. The existence of such a damper-closing torque is well known phenomena in the field of air flow control.

It will be readily apparent that control 18 must be powerful enough to maintain damper 14 in a desired position in opposition to the torque developed by the aerodynamic forces acting upon damper 14. The objective of the present invention is to reduce the damper-closing torque so that a smaller, less powerful control can be employed while still obtaining accurate position control. This objective is accomplished according to the invention by changing the air flow conditions in the duct so that the air velocity in the proximity of at least a portion of leading section 22 of damper 14 is reduced. Since, for a given angle $\alpha$, the pressure acting upon damper 14 varies with air velocity the pressure differential across leading section 22 will be decreased and a consequent reduction in damper-closing torque is obtained.

Figure 4:
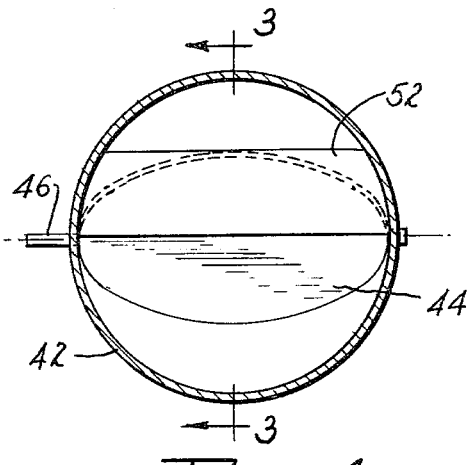
FIG. 4 is an end view of FIG. 3, partially in section, taken along the line 4—4.
Figure 3:
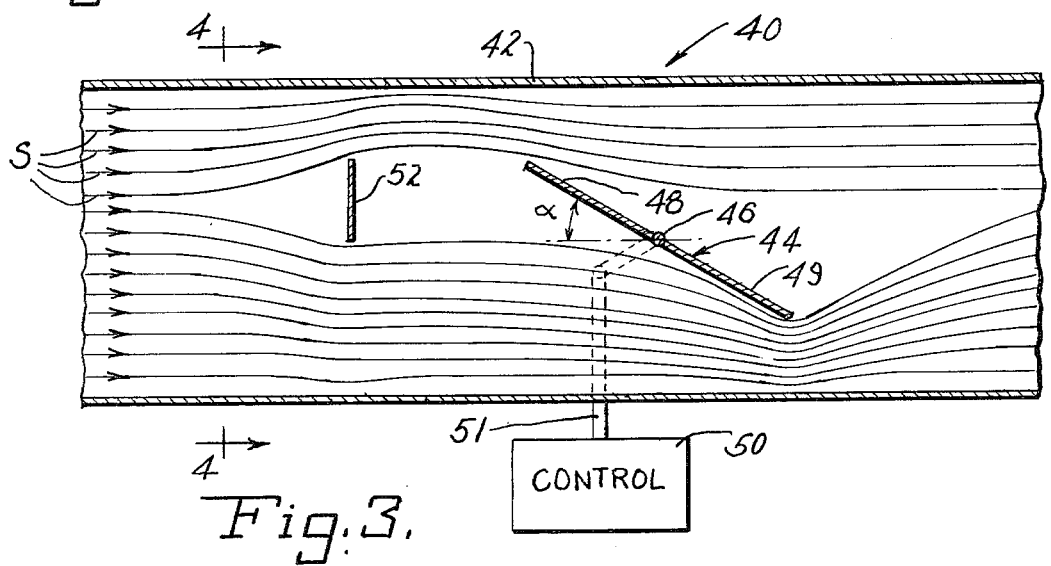
FIG. 3 is a section view of a preferred embodiment of the invention taken along line 3—3 of FIG. 4 showing an approximate air flow pattern.

In the preferred embodiment shown in FIG. 3 an air flow controller, generally indicated at 40, comprises a duct 42 and a damper 44 rotatably supported in duct 42 by pivot 46 extending through a central axis of damper 44 such that the damper is divided into a leading section 48 and a trailing section 49. A control 50 is operatively connected to damper 44 by linkage 51 to position damper 44 in the normal manner. Controller 40 is additionally provided with an air flow impedance, such as baffle 52, located upstream from damper 44 to change the pattern of the air flow acting upon damper 44 so as to accomplish the aforementioned objective. As shown in FIGS. 3 and 4, baffle 52 comprises a flat plate located in a plane substantially perpendicular to the air flow and extending across duct 42 substantially parallel to the axis about which damper 44 pivots.

It will be readily apparent that variations in the size, shape and location of the air flow impedance can have substantial effects on the air flow in the duct. Consequently, while torque reduction can be achieved with an impedance having numerous configurations and locations it will generally be necessary to design the air flow impedance to conform to the requirements of the system in which controller 40 is employed. For example, in a building air distribution system certain inlet pressure parameters are applicable and the air flow impedance must not unduly restrict the air flow within duct 42.

With such considerations in mind, an examination of the torque vs. angle of attack curve in FIG. 2 for a typical air flow controller without air flow impedance discloses that torque on the damper is greatest at relatively low angles of attack, such as between 5° and 20°. Thus in the preferred embodiment shown in FIGS. 3 and 4 baffle 52 is located within duct 42 in a position which reduces the velocity of the air acting over substantially the entire area of leading section 48 when damper 44 is at relatively low angles of attack.

Figure 5:
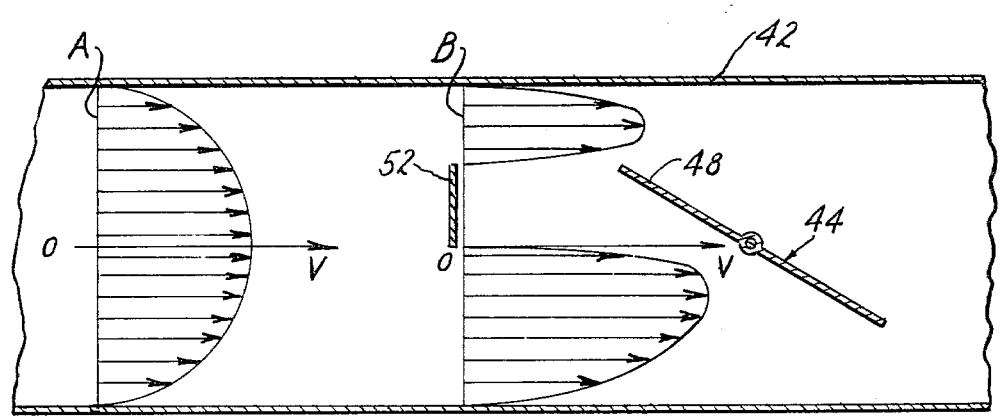
FIG. 5 is a section view of a portion of FIG. 3 showing the approximate velocity profiles upstream and immediately downstream of the baffle in the embodiment shown in FIG. 3.

An approximation of the resulting air flow pattern is shown in FIG. 3 by streamlines S and it is apparent that a substantial portion of the air flow is deflected away from leading section 48, passing on either side of baffle 52. An approximation of the effect on the velocity profile of the air flow is illustrated in FIG. 5. A graphical representation of a typical velocity profile of unimpeded air flow across a plane A perpendicular to the air flow is shown upstream from baffle 52. Velocity, V, is plotted along an abscissa through the center of duct 42. The effect of baffle 52 on the air flow is seen by examining an approximate velocity profile across a similar plane B immediately downstream from baffle 52. As shown, the velocity profile is such that air velocity immediately behind baffle 52 is substantially zero. At points further downstream from baffle 52 the air flow diffuses so that the air velocity behind baffle 52 gradually approaches normal flow as the distance from baffle 52 increases. Thus, it will be readily apparent that baffle 52 must be located such that the leading section 48 of damper 44 is within the low velocity area directly behind baffle 52. Since the pressure acting upon damper 44 is dependent upon the velocity of the air flow, the resulting pressure differential across leading section 48 is decreased and there is a consequent reduction in the damper-closing torque.

It will be noted that as the angle of attack increases a portion of leading section 48 of damper 44 moves out of the low velocity area and the torque reduction effect is thus somewhat diminished. This is apparent from the graph in FIG. 2 for an air flow controller having such an impedance. But such an arrangement still permits a substantial degree of torque reduction without unduly restricting the airflow for damper positions where the torque is high.

Figure 6:
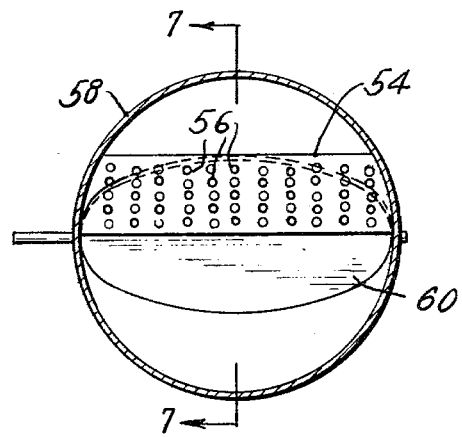
FIG. 6 is an end view, partially in section, of a preferred embodiment of the invention having a perforated baffle.
Figure 7:
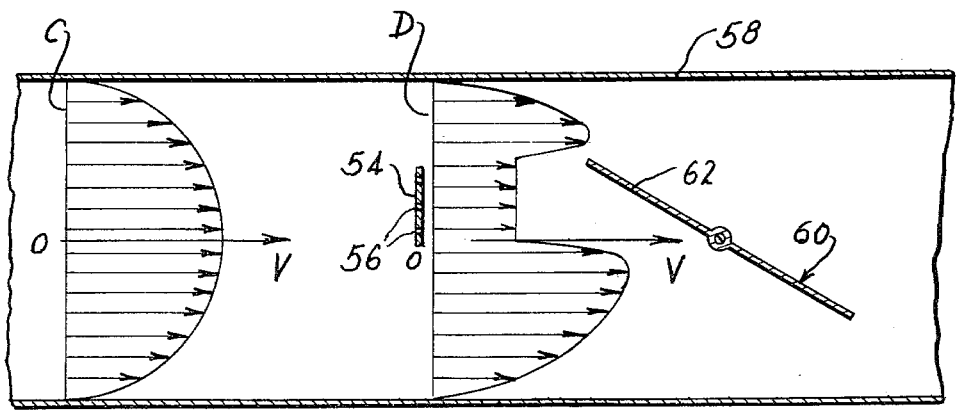
FIG. 7 is a section view taken along the line 7—7 of the embodiment shown in FIG. 6 showing the approximate velocity profiles upstream and immediately downstream from the baffle.

System parameters may necessitate designing the air flow impedance so as to restrict air flow even less than the previously described embodiment. It has been found that simply providing a smaller baffle will not necessarily solve this problem since the effective area of velocity reduction may not be sufficiently large to achieve significant torque reduction. In such a situation the desired effective area of velocity reduction can be obtained by providing a baffle having one or more openings therethrough. In another embodiment of the invention shown in FIG. 6 a baffle 54 having a plurality of openings 56 is located in duct 58 upstream from damper 60. Baffle 54 is preferably positioned in a plane substantially perpendicular to the air flow in a manner similar to baffle 52 in the embodiment shown in FIGS. 3 and 4. Openings 56 may be of any suitable size, shape and number but are preferably small and numerous so as to give baffle 54 a honeycombed appearance. This construction provides a relatively uniform flow behind baffle 54. It will be readily apparent that honeycombed baffle 54 will deflect only a portion of the air flow while permitting a certain amount of air to pass through the baffle. An approximation of the resulting effect on velocity profile is illustrated graphically in FIG. 7. The velocity profile of the normal air flow is shown across plane C perpendicular to the air flow and upstream from baffle 54. In a plane D immediately downstream from baffle 54 and perpendicular to the air flow the velocity profile is such that air velocity immediately behind baffle 54 is somewhat decreased but does not approach 0 as in the case of the baffle 52 shown in FIG. 5. There will be a decrease in the pressure differential across leading section 62 of damper 60, and a consequent reduction in the damper-closing torque, but to a lesser degree than that obtained using baffle of the same size having no openings therethrough. This construction permits the use of an air flow impedance which does not unduly restrict the air flow but still results in an air velocity reduction over substantially the same area.

Figure 8:
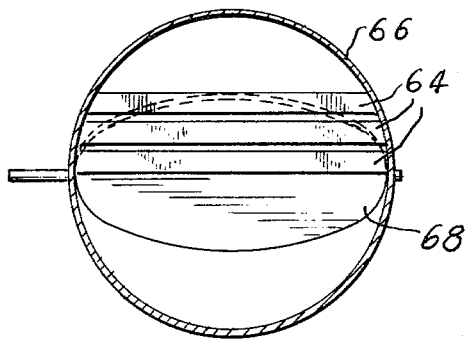
FIG. 8 is an end, partially in section, view of a preferred embodiment of the invention having a plurality of baffles.

Another embodiment of the invention is shown in FIG. 8 in which the air flow impedance comprises a plurality of baffles 64 located in a duct 66 upstream from a damper 68. As shown, baffles 64 are spaced apart to permit a certain amount of air to flow between the baffles thereby creating an effect similar to that discussed with respect to the embodiments shown in FIGS. 6 and 7. Baffles 64 may be located in the same plane or in different planes as desired. Various arrangements can be employed to obtain a particular air flow effect.

It will be readily apparent that numerous configurations, constructions, locations and orientation of an air flow impedance can be employed without departing from the scope and spirit of the invention. For example, the impedance need not be constructed as a flat baffle but could take on other shapes. The impedance can be located in numerous positions within the medial portions of the duct and is not restricted to a location as shown in the embodiments described. While the embodiments described show a baffle located in a plane substantially perpendicular to the air flow, the baffle could also be oriented differently such as inclined. In view of the foregoing, the preferred embodiments described are intended to be exemplary only and the invention is limited solely by the claims.

What is claimed is:

1. A volume air flow controller comprising a duct, a butterfly damper mounted in the duct, said damper movable about a pivot and having leading and trailing portions, and control means adapted to position said damper to control air flow through the duct, and a fixed air flow impedance located in said duct upstream from said damper and extending across said duct generally in the direction of the damper axis, said air flow impedance medially positioned within said duct offset to the leading portion-side of the axis of said damper and displaced from substantially opposite duct wall portions so as to permit portions of the air flow to pass between said opposite duct wall portions and respective sides of said air flow impedance in the directions of said leading and trailing portions respectively, said impedance changing the air velocity profile within the duct so that the velocity of air acting upon at least a portion of the leading portion of said damper is reduced whereby the damper-closing torque resulting from the aerodynamic forces produced by air flow past said damper is reduced.

2. A volume air flow controller according to claim 1 wherein said air flow impedance comprises a baffle.

3. A volume air flow controller according to claim 2 wherein said baffle comprises a substantially flat plate extending across said duct substantially parallel to the axis about which said damper pivots.

4. A volume air flow controller according to claim 2 wherein said baffle comprises a substantially flat plate located in a plane substantially perpendicular to the air flow in said duct.

5. A volume air flow controller according to claim 2 wherein said baffle comprises a substantially flat plate located in a plane parallel to the axis about which said damper pivots.

6. A volume air flow controller according to claim 2 wherein said baffle has at least one opening therethrough.

7. A volume air flow controller according to claim 6 wherein said baffle is honeycombed.

8. A volume air flow controller according to claim 1 wherein said air flow impedance comprises a plurality of baffles spaced apart.

* * * * *